(12) United States Patent
Ji

(10) Patent No.: US 10,670,241 B2
(45) Date of Patent: Jun. 2, 2020

(54) LAMP INSTALLATION COMPONENT

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Feng Ji, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/425,464

(22) Filed: May 29, 2019

(65) Prior Publication Data

US 2019/0368700 A1 Dec. 5, 2019

(30) Foreign Application Priority Data

Jun. 1, 2018 (CN) .......................... 2018 1 0560983

(51) Int. Cl.

| | |
|---|---|
| *F21V 21/088* | (2006.01) |
| *F21V 21/116* | (2006.01) |
| *F16M 11/04* | (2006.01) |
| *F16B 2/12* | (2006.01) |
| *A47F 3/00* | (2006.01) |
| *F16M 13/02* | (2006.01) |

(52) U.S. Cl.
CPC ............ *F21V 21/088* (2013.01); *A47F 3/001* (2013.01); *F16B 2/12* (2013.01); *F16M 11/041* (2013.01); *F21V 21/116* (2013.01); *F16M 13/02* (2013.01); *F16M 13/022* (2013.01); *F21V 21/0885* (2013.01)

(58) Field of Classification Search
CPC .... F16M 11/041; F16M 13/02; F16M 13/022; F21V 21/088; F21V 21/116; F21V 21/145; F21V 21/0885; F16B 2/12; F16B 7/0433; F41G 11/003; A47F 3/001

USPC ............ 248/316.4, 231.41; 362/396; 411/94, 411/209

See application file for complete search history.

(56) References Cited

U.S. PATENT DOCUMENTS

| | | | | |
|---|---|---|---|---|
| 1,280,955 A | * | 10/1918 | Bowen ................... | F16M 13/02 248/231.41 |
| 2,259,522 A | * | 10/1941 | Hall ........................ | B63B 45/06 248/278.1 |

(Continued)

FOREIGN PATENT DOCUMENTS

DE 102006004998 A1 * 5/2007 ................ F16B 2/12

*Primary Examiner* — Hiwot E Tefera
*Assistant Examiner* — Taylor L Morris
(74) *Attorney, Agent, or Firm* — Wang Law Firm, Inc.

(57) ABSTRACT

The present invention relates to a lamp installation component comprising a clamping assembly for clamping on part to be clamped, and a mounting frame for assembling the lamp; the clamping assembly includes fixed part, abutting part, movable part and elastic part, and the fixed part is relatively fixed with the abutting part, and the movable part is slidably disposed between the fixed part and the abutting part, and the elastic part is held between the movable part and the abutting part, so that the movable part has a tendency to form a clamped state close to the fixed part; the mounting frame is fixedly connected to the abutting part. The lamp installation component has a simple structure and can be installed or disassembled with one hand, and is more convenient for use in a showcase or other small installation space.

8 Claims, 7 Drawing Sheets

(56) References Cited

U.S. PATENT DOCUMENTS

| | | | | |
|---|---|---|---|---|
| 2,306,389 A * | 12/1942 | Jorgensen | F16B 21/16 | 403/282 |
| 2,319,377 A * | 5/1943 | Wallace | B25B 5/02 | 24/523 |
| 2,459,006 A * | 1/1949 | Sova | A47G 25/746 | 211/85.3 |
| 2,621,882 A * | 12/1952 | Fletcher | F21V 21/26 | 248/282.1 |
| 2,703,594 A * | 3/1955 | Slinkard | E04G 21/18 | 269/154 |
| 2,795,859 A * | 6/1957 | Buschbach | G01B 5/255 | 33/370 |
| 2,821,762 A * | 2/1958 | Foose | A47C 1/124 | 24/459 |
| 2,935,286 A * | 5/1960 | Parsons | F16M 13/022 | 248/227.4 |
| 2,963,679 A * | 12/1960 | Jugle | H01R 4/44 | 439/781 |
| 3,078,367 A * | 2/1963 | Jackson | F21V 15/02 | 362/296.01 |
| 3,203,030 A * | 8/1965 | Barnes | B41F 15/36 | 16/248 |
| 3,275,276 A * | 9/1966 | Johnson | G05G 5/00 | 248/500 |
| 3,378,221 A * | 4/1968 | Wolar | F21V 21/02 | 248/343 |
| 3,601,295 A * | 8/1971 | Lowe | B60R 9/06 | 224/42.38 |
| 3,617,730 A * | 11/1971 | Mihailoff | F21V 33/00 | 362/86 |
| 3,704,368 A * | 11/1972 | Patry | F21V 3/00 | 362/434 |
| 3,891,173 A * | 6/1975 | Ellis | B63B 45/06 | 248/231.71 |
| 3,899,149 A * | 8/1975 | Schneider | A61G 7/0503 | 248/75 |
| 3,963,208 A * | 6/1976 | Sova | A47F 5/0884 | 248/316.4 |
| 4,639,036 A * | 1/1987 | Nichols | A47C 7/62 | 248/230.2 |
| 4,866,583 A * | 9/1989 | Targetti | F21S 2/00 | 362/404 |
| 4,904,105 A * | 2/1990 | Myers | E04C 2/428 | 403/24 |
| 5,042,118 A * | 8/1991 | Rubik | A47G 25/485 | 24/523 |
| 5,092,552 A * | 3/1992 | Dayton | F16C 11/0661 | 248/181.1 |
| 5,237,767 A * | 8/1993 | Kringel | G09F 3/204 | 248/231.41 |
| 5,381,263 A * | 1/1995 | Nowak | G02B 7/002 | 351/158 |
| 5,690,459 A * | 11/1997 | Donovan | F16B 17/006 | 29/509 |
| 5,725,356 A * | 3/1998 | Carter | F04D 25/08 | 416/240 |
| 6,012,827 A * | 1/2000 | Caplan | F21L 15/14 | 362/103 |
| 6,042,066 A * | 3/2000 | Maharg | A47B 96/1425 | 248/200.1 |
| 6,220,728 B1 * | 4/2001 | Andrus | F21V 21/116 | 362/287 |
| 6,227,688 B1 * | 5/2001 | Taylor | B62J 6/00 | 340/432 |
| 6,435,476 B1 * | 8/2002 | Stratman | B66F 13/00 | 254/1 |
| 6,523,790 B2 * | 2/2003 | Sentpali | F16B 2/12 | 248/68.1 |
| 6,536,911 B1 * | 3/2003 | DiAngelo | F21V 21/0832 | 33/772 |
| 6,536,982 B2 * | 3/2003 | Gibbons | F16B 7/0433 | 403/391 |
| 6,575,587 B2 * | 6/2003 | Cramer | F21L 14/00 | 362/105 |
| 6,773,172 B1 * | 8/2004 | Johnson | F16M 11/041 | 248/187.1 |
| 6,880,791 B1 * | 4/2005 | Lin | F16M 13/02 | 248/231.61 |
| 6,883,761 B2 * | 4/2005 | Boon | F16L 3/237 | 248/229.24 |
| 6,896,232 B2 * | 5/2005 | Crowell | B25B 5/06 | 248/229.12 |
| 6,904,720 B1 * | 6/2005 | Adolfson | E04F 13/002 | 160/368.1 |
| 7,073,995 B2 * | 7/2006 | Herb | F16B 37/046 | 411/85 |
| 7,104,673 B2 * | 9/2006 | Yu | F21S 9/02 | 362/191 |
| 7,125,380 B2 * | 10/2006 | Yager | A61B 17/02 | 600/227 |
| 7,182,490 B2 * | 2/2007 | Hsu | F21S 9/02 | 362/396 |
| 7,188,978 B2 * | 3/2007 | Sharrah | F21S 9/02 | 362/396 |
| 7,387,285 B2 * | 6/2008 | Thomason | A47D 15/00 | 248/103 |
| 7,556,229 B2 * | 7/2009 | Elliott | F16B 2/185 | 224/536 |
| 7,617,649 B2 * | 11/2009 | Arakawa | A47F 5/0006 | 248/317 |
| 7,686,267 B2 * | 3/2010 | DaSilva | A61B 17/02 | 248/228.5 |
| 7,857,394 B2 * | 12/2010 | Whelan | A61G 5/10 | 297/440.2 |
| 7,980,017 B2 * | 7/2011 | Harman, III | F41C 27/00 | 42/94 |
| 8,151,508 B1 * | 4/2012 | Moore | F41G 1/54 | 42/124 |
| 8,156,615 B2 * | 4/2012 | Komeno | B60R 11/00 | 24/297 |
| 8,162,277 B2 * | 4/2012 | Russell | H04R 1/026 | 248/274.1 |
| 8,226,057 B2 * | 7/2012 | Ao | H01Q 1/1228 | 248/218.4 |
| 8,282,063 B2 * | 10/2012 | Ou | B60R 11/0241 | 248/316.3 |
| 8,312,668 B2 * | 11/2012 | Kincel | F41G 11/004 | 42/114 |
| 8,382,054 B2 * | 2/2013 | Hsu | B01L 9/52 | 248/316.4 |
| 8,393,105 B1 * | 3/2013 | Thummel | F41G 11/004 | 42/127 |
| 8,403,281 B2 * | 3/2013 | Burtscher | F24S 25/636 | 248/229.24 |
| 8,424,820 B2 * | 4/2013 | Cotirla | A63H 33/006 | 248/214 |
| 8,438,965 B2 * | 5/2013 | Collin | F41G 11/003 | 89/125 |
| 8,523,858 B2 * | 9/2013 | Lessig | A61B 17/645 | 24/135 R |
| 8,783,416 B2 * | 7/2014 | Singleton | B61K 3/00 | 184/3.1 |
| 8,821,044 B1 * | 9/2014 | Dordick | G03B 17/561 | 248/176.3 |
| 8,985,795 B2 * | 3/2015 | Thomas | F21V 21/00 | 362/92 |
| 9,158,182 B1 * | 10/2015 | Lewin | G03B 17/561 | |
| 9,644,763 B2 * | 5/2017 | Flucke | F16L 3/02 | |
| 2006/0067089 A1 * | 3/2006 | Hocquard | A47F 3/001 | 362/576 |
| 2006/0117636 A1 * | 6/2006 | Newhall | F41G 11/003 | 42/124 |
| 2007/0235608 A1 * | 10/2007 | Blye | F21V 21/0885 | 248/229.14 |
| 2007/0241253 A1 * | 10/2007 | Chen | F16B 7/0433 | 248/304 |

(56) References Cited

U.S. PATENT DOCUMENTS

| | | | |
|---|---|---|---|
| 2009/0008521 A1* | 1/2009 | Lee | F16M 11/041 248/226.11 |
| 2009/0086478 A1* | 4/2009 | Sanroma | A47F 3/001 362/234 |
| 2009/0199370 A1* | 8/2009 | Conti | F21V 21/088 24/458 |
| 2010/0102185 A1* | 4/2010 | Jenestreet | F16B 12/42 248/218.4 |
| 2010/0326930 A1* | 12/2010 | Chiang | A47B 97/00 211/26 |
| 2011/0076095 A1* | 3/2011 | Storch | F41C 27/00 403/322.4 |
| 2011/0146128 A1* | 6/2011 | Haering | F41G 11/003 42/90 |
| 2011/0247255 A1* | 10/2011 | Ding | F41G 11/003 42/90 |
| 2011/0315840 A1* | 12/2011 | Connolly | F16M 11/041 248/220.31 |
| 2012/0056059 A1* | 3/2012 | Delamater | F16M 11/105 248/299.1 |
| 2012/0081913 A1* | 4/2012 | Dew | F21V 21/0885 362/396 |
| 2012/0104211 A1* | 5/2012 | Saijo | F16M 11/041 248/316.4 |
| 2012/0198745 A1* | 8/2012 | Riley | F41C 27/00 42/90 |
| 2013/0000176 A1* | 1/2013 | Goertzen | F41G 11/001 42/90 |
| 2013/0156495 A1* | 6/2013 | Li | F41G 11/003 403/322.4 |
| 2015/0233116 A1* | 8/2015 | Mayer | E04B 9/247 52/506.05 |
| 2015/0351779 A1* | 12/2015 | Slagle | A61G 13/101 211/85.13 |
| 2016/0186966 A1* | 6/2016 | Shen | F21V 21/116 403/144 |
| 2016/0362066 A1* | 12/2016 | Lee | B60R 11/02 |
| 2017/0191649 A1* | 7/2017 | Zhang | F21V 23/06 |
| 2017/0284433 A1* | 10/2017 | Thomas | F16C 11/106 |

* cited by examiner

LAMP INSTALLATION COMPONENT

RELATED APPLICATION

This application claims priority to a Chinese Patent Application No. CN 201810560983.2, filed on May 31, 2018.

FIELD OF THE TECHNOLOGY

The present invention relates to lighting equipment field, with particular emphasis on a lamp installation component.

BACKGROUND OF THE INVENTION

At present, most of the lamps are fixed on the wall or the showcase by screws. This type of fixing needs to be punched in the wall or the frame, which is troublesome to operate. Sometimes more people need to cooperate to complete the installation, and when disassembling it is also more difficult. Especially in the narrow space such as the cabinet or the exhibition stand, it is very inconvenient to install the lamp, and the user can basically not complete the installation operation with one hand, and it is time consuming and laborious.

Therefore, the existing installation methods of lamps need further improvement.

BRIEF SUMMARY OF THE INVENTION

The technical problem to be solved by the present invention is to provide a lamp installation component with convenient installation and disassembly for the current state of the art.

The technical solution adopted by the present invention to solve the above problems is as follows: a lamp installation component, comprising: a clamping assembly for clamping on part to be clamped, and a mounting frame for assembling the lamp; the clamping assembly includes fixed part, abutting part, movable part and elastic part, and the fixed part is relatively fixed with the abutting part, and the movable part is slidably disposed between the fixed part and the abutting part, and the elastic part is held between the movable part and the abutting part, so that the movable part has a tendency to form a clamped state close to the fixed part; the mounting frame is fixedly connected to the abutting part.

Advantageously, a fixing column is disposed between the fixed part and the abutting part, and the one end of the fixing column is fixedly connected to the fixed part, and the other end is fixedly connected to the abutting part; the movable part is provided with a slide hole, and the movable part is slidably sleeved on the fixing column through the slide hole. The fixing column can play a guiding limit role, making the movable part more flexible and convenient to slide on the fixing column.

Advantageously, a guide ribs is further formed along the axial direction on the side wall of the fixing column, and a periphery of the slide hole on the movable part has guide rib slots adapted to the guide rib. The limit matching of the guide rib 301 and the guide rib slot 132 is to prevent the movable part 13 from rotating in the sliding process, making the clamping between fixed parts and movable parts more firm.

Advantageously, the number of elastic parts is two, and the two elastic parts are symmetrically arranged on both sides of the fixing column. The elastic parts may also be multiple, and are evenly symmetrically spaced around the periphery of the fixing column. Such a structural arrangement makes the force of the movable part more balanced, and the sliding process is more stable and flexible.

Advantageously, the elastic part is a spring, and the movable part has a first accommodating groove, and the abutting part has a second accommodating groove, and one end of the spring abuts in the first accommodating groove and the other end of the spring abuts in the second accommodating groove. Such a structural arrangement can allow the two ends of the spring to be respectively accommodated in the two accommodating grooves to avoid falling off or offset.

Advantageously, a positioning grooves with inward concave is formed on the two opposite faces of the fixed part and the movable part, and the part to be clamped after clamping can be limited within the positioning groove. Such a structural setting can make the fixture between the lamp installation component and the part to be clamped more secure and not easy to slide or fall off.

Advantageously, the mounting frame is a strip-shaped card slot, and the card slot is fixedly connected to the abutting part by screws. The lamp to be installed can be stuck in the strip-shaped card slot for convenient installation and disassembly Advantageously, a strip rib for limiting the movement of the card slot along the length direction is arranged on the abutting part corresponding to the corresponding position of the two ends of the card slot.

Advantageously, the card slot is further provided with a spacing hole on the bottom wall fitting with the abutting part, correspondingly, the abutting part has a limiting protrusion that is inserted into the spacing hole. The limiting protrusions and the spacing holes cooperate with each other to prevent the card slot from rotating or sliding relative to the abutting part, so that the fixing of the card slot is more secure.

Advantageously, the fixed part, the movable part and the abutting part are all plate-like structures. The plate structure is convenient for processing and has low production cost. Of course, the fixed parts, movable parts and abutting parts can also be processed into other suitable structures according to the different installation positions or the different shapes of the parts to be clamped.

In order to facilitate the user to quickly separate the fixed part from the movable part and then clamp the part to be clamped at the position to be installed, the wall face of the fixed part toward the movable part is also provided with a partition block for isolating the fixed part from the movable part. Under the action of partition block, the fixed part and the movable part can form an isolation gap that is convenient for users to separate them.

Compared with the prior art, the invention has the advantages that the lamp installation component of the invention comprises a clamping assembly and a mounting frame, wherein the mounting frame can be directly engaged into the lamp, and the clamping assembly is used for clamping on the part to be clamped at the position to be installed, the clamping assembly includes fixed part, abutting part, movable part and elastic part. When installing this lamp installation component, only the movable part needs to be pressed during installation, so that the fixed part and the movable part are away from each other, that is, the clamping portion is in an open state, and then make the part needing to be clamped be located in the clamping portion and then loosen the movable part. At this time, the movable part is reset and clamped the part needing to be clamped under the action of elastic part. The lamp installation component has a simple structure, and users can complete the installation or disassembly with one hand, which is also more convenient for the exhibition cabinet or other narrow installation space.

BRIEF DESCRIPTION OF THE DRAWINGS

The drawings described herein are intended to promote a further understanding of the present invention, as follows.

DETAILED DESCRIPTION OF THE INVENTION

Figure 1:
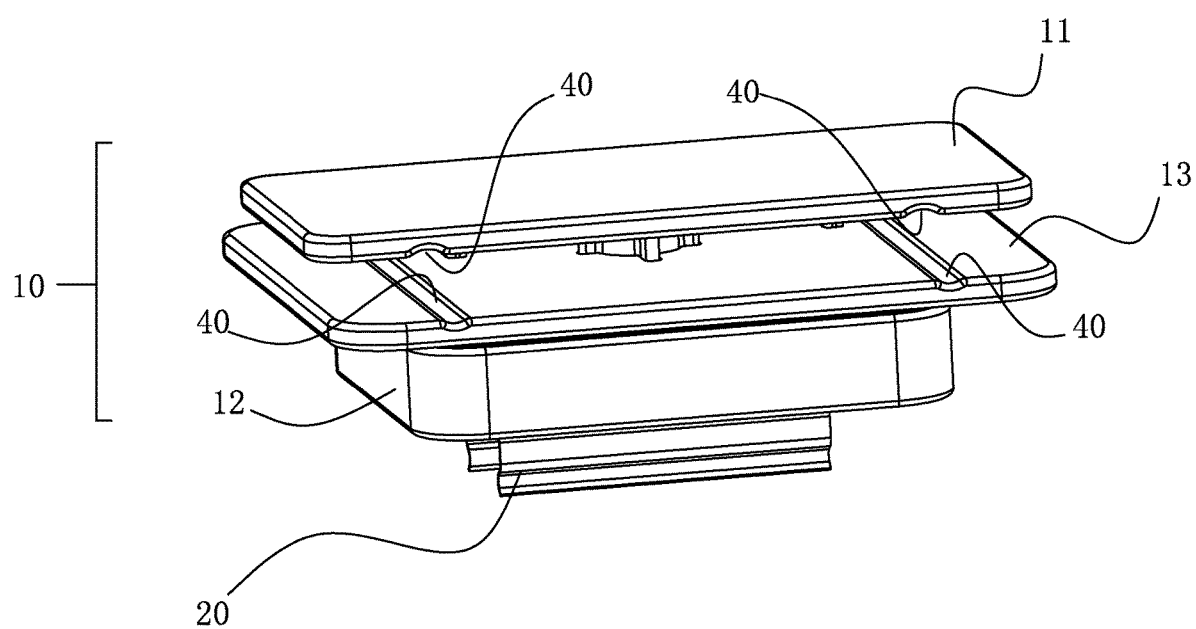
FIG. 1 is a three-dimensional structural diagram of lamp installation component according to an embodiment of the present invention.
Figure 2:
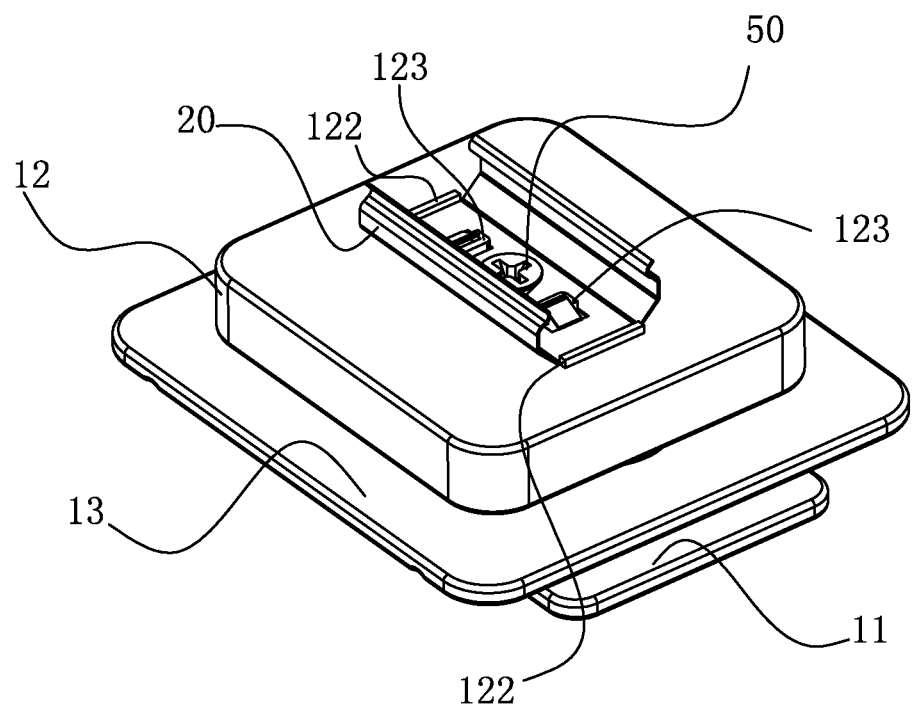
FIG. 2 is another angular three-dimensional structural diagram of lamp installation component according to an embodiment of the present invention.

The present application is illustrated by way of the following detailed description based on of the accompanying drawings. It should be noted that illustration to the embodiment in this application is not intended to limit the invention.

As shown in FIG. 1 to FIG. 5, the lamp installation component includes a clamping assembly 10 and a mounting frame 20, wherein the clamping assembly 10 is fixedly connected with the mounting frame 20, and the clamping assembly 10 is used to fasten on the clamping parts on the wall or in the exhibition cabinet so as to be fixed on the wall or in the exhibition cabinet. The mounting frame 20 is used for mounting the lamp. In the present embodiment, the clamping assembly 10 includes fixed part 11, abutting part 12, movable part 13 and elastic part. The fixed part 11 is relatively fixed with the abutting part 12, and the movable part 13 is slidably disposed between the fixed part 11 and the abutting part 12. The elastic part 14 is held between the movable part 13 and the abutting part 12, so that the movable part 13 has the tendency of forming a clamping state close to the fixed part 11. That is, under the elastic force of the elastic part 14, a clamping portion is formed between the movable part 13 and the fixed part 11 for clamping and fixing the fixed part 11 to be clamped. The mounting frame 20 is fixedly connected to the abutting part 12. When installing this lamp installation component, only the movable part 13 needs to be pressed during installation, so that the fixed part 11 and the movable part 13 are away from each other, that is, the clamping portion is in an open state, and then make the part needing to be clamped be located in the clamping portion and then loosen the movable part 13. At this time, the movable part 13 is reset and clamped the part needing to be clamped under the action of elastic part 14. The lamp installation component has a simple structure, and users can complete the installation or disassembly with one hand, which is also more convenient for the exhibition cabinet or other narrow installation space.

Figure 3:
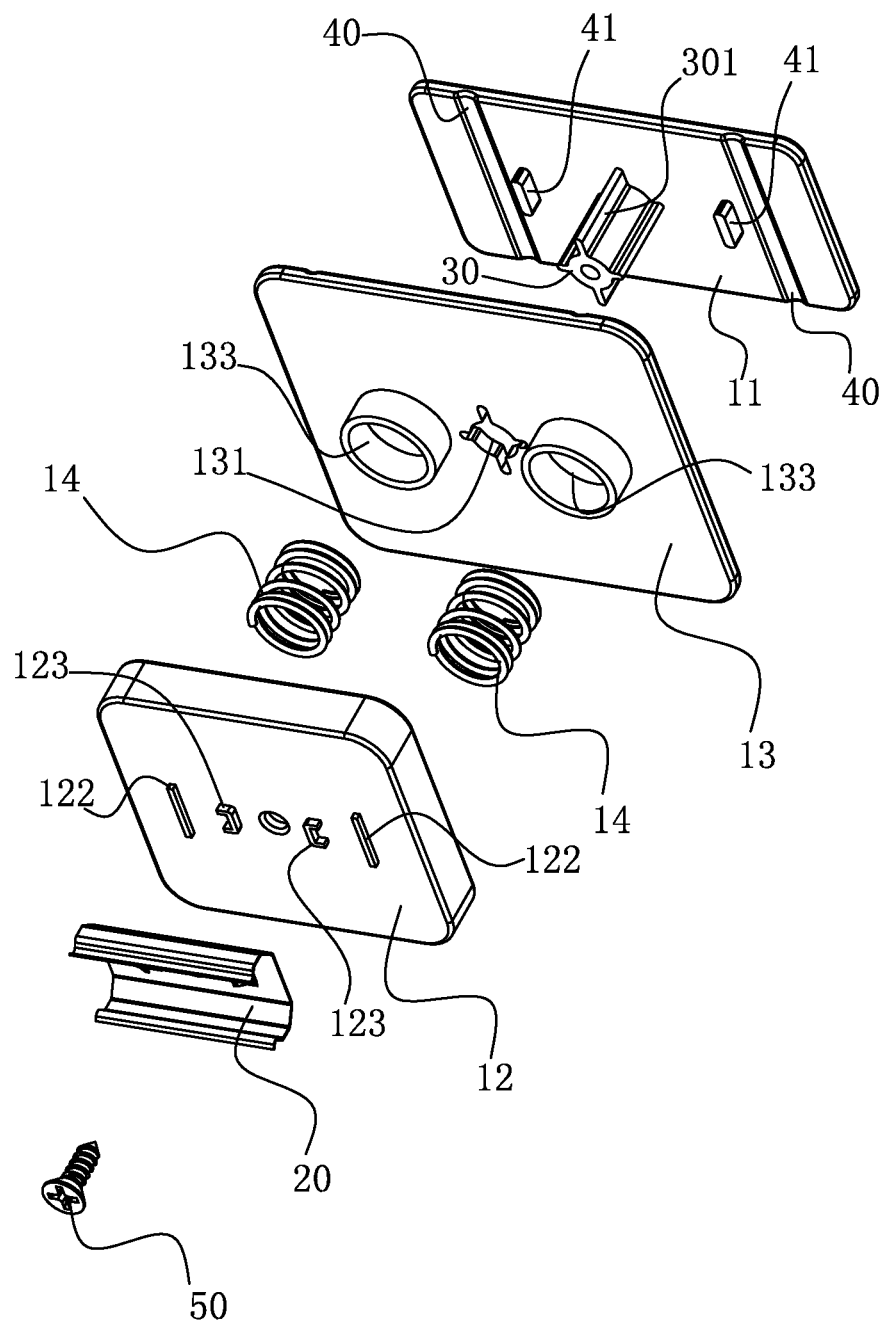
FIG. 3 is an exploded perspective view of lamp installation component according to an embodiment of the present invention.
Figure 7:
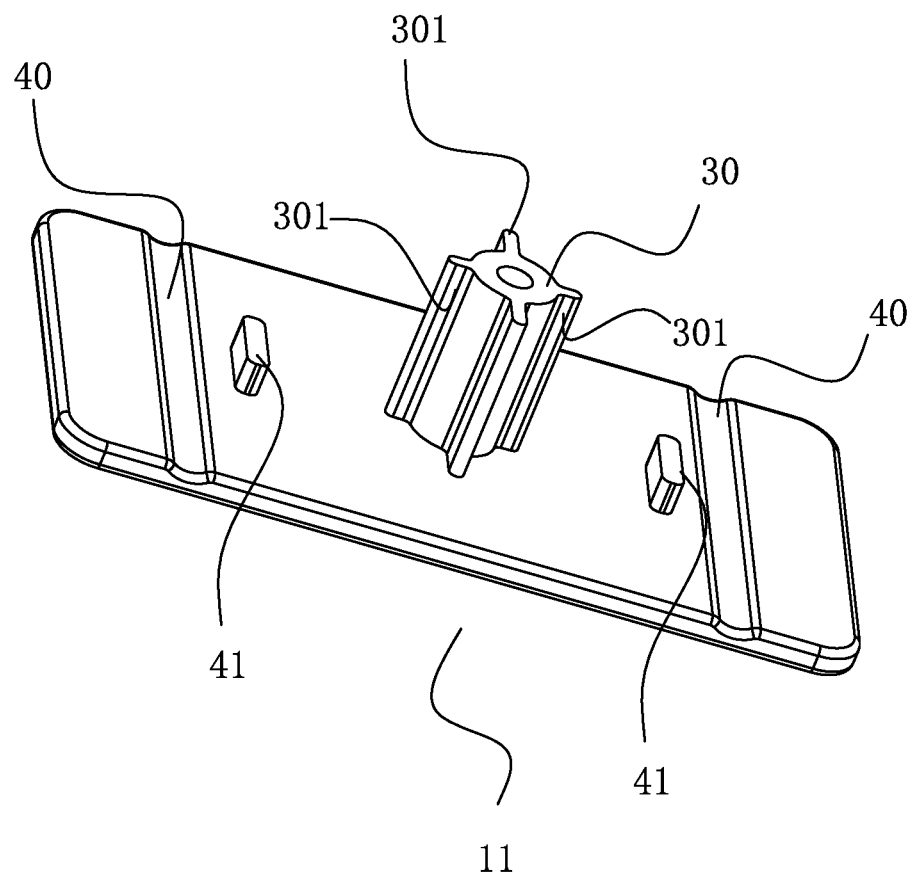
FIG. 7 is a three-dimensional structural diagram of a fixed part of lamp installation component according to an embodiment of the present invention.

Referring to FIG. 3 and FIG. 7, in the embodiment, in order to make the movable part 13 slide better between the fixed part 11 and the abutting part 12, a fixing column 30 is disposed between the fixed part 11 and the abutting part 12. The one end of the fixing column 30 is fixedly connected to the fixed part 11, and the other end is fixedly connected to the abutting part 12. Correspondingly, the movable part 13 is provided with a slide hole 131, and the movable part 13 is slidably sleeved on the fixing column 30 through the slide hole 131. The fixing column 30 can serve as a guide limit, so that the movable part 13 can be more flexibly and conveniently slipped on the fixing column 30. It is conceivable to those skilled in the art that the fixing column 30 and the fixed part 11 can be integrally formed by injection molding or other means to reduce the number of parts for easy installation, and the other end of the fixing column 30 is detachably connected with the abutting part 12 so that the movable part 13 is sleeved from this end on the fixing column 30. More specifically, in order to prevent the movable part 13 from rotating during the sliding process and then make the clamping between the fixed part 11 and the movable part 13 more secure, guide ribs 301 is further formed along the axial direction on the side wall of the fixing column 30. Correspondingly, the periphery of the slide hole 131 on the movable part 13 has guide rib slots 132 adapted to the guide rib 301. In the present embodiment, there are four guide ribs 301 evenly spaced on the side wall of the fixing column 30 and radially distributed, and there are also four guide rib slots 132 evenly spaced on the periphery of slide hole 131. On the other hand, the limit matching of the guide rib 301 and the guide rib slot 132 is to prevent the movable part 13 from rotating in the sliding process, so as to avoid the elastic part 14, which is clamped between the movable part 13 and the abutting part 12, from being offset or falling off due to the rotation of the movable part 13.

Figure 4:
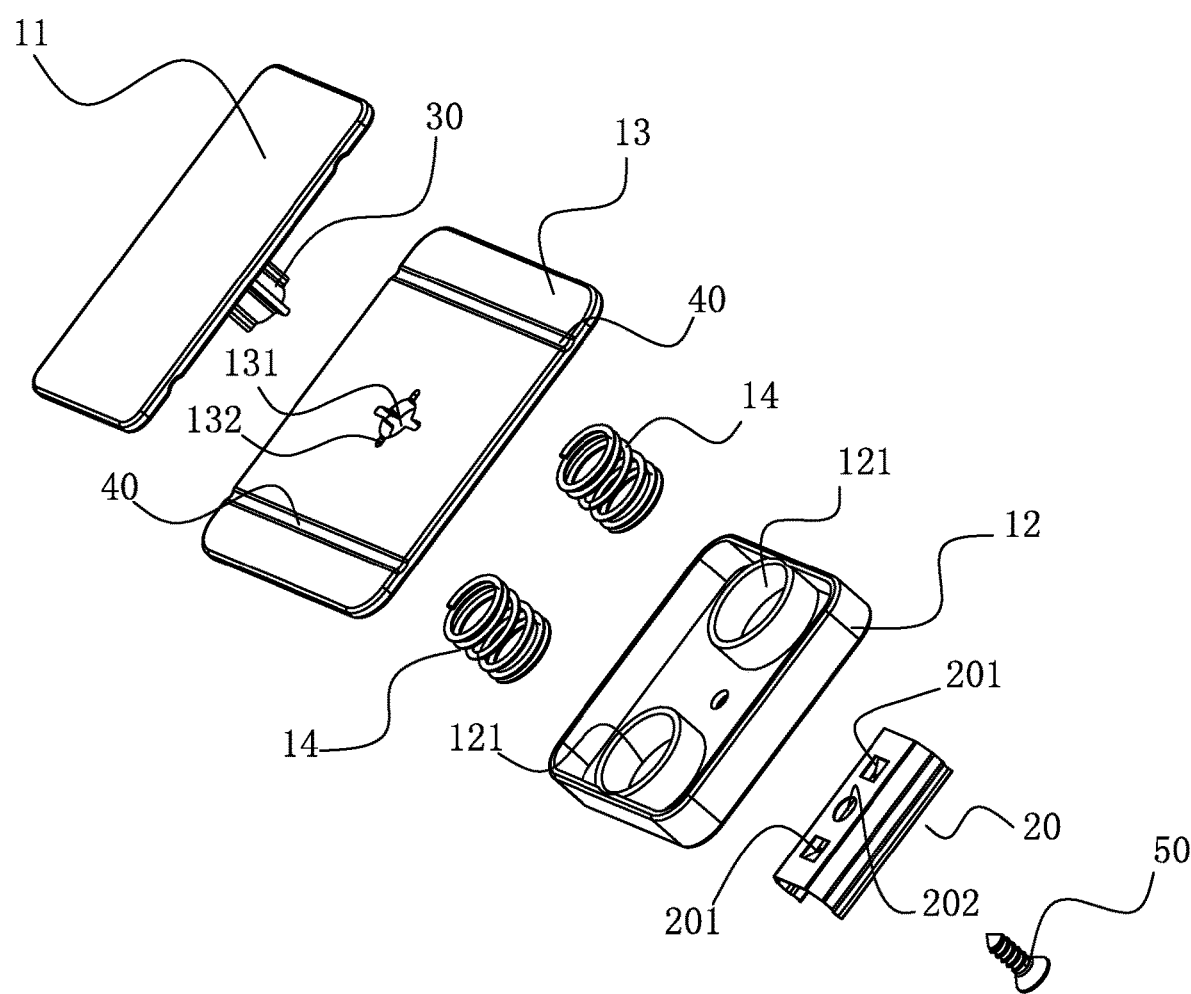
FIG. 4 is another angular exploded perspective view of lamp installation component according to an embodiment of the present invention.
Figure 6:
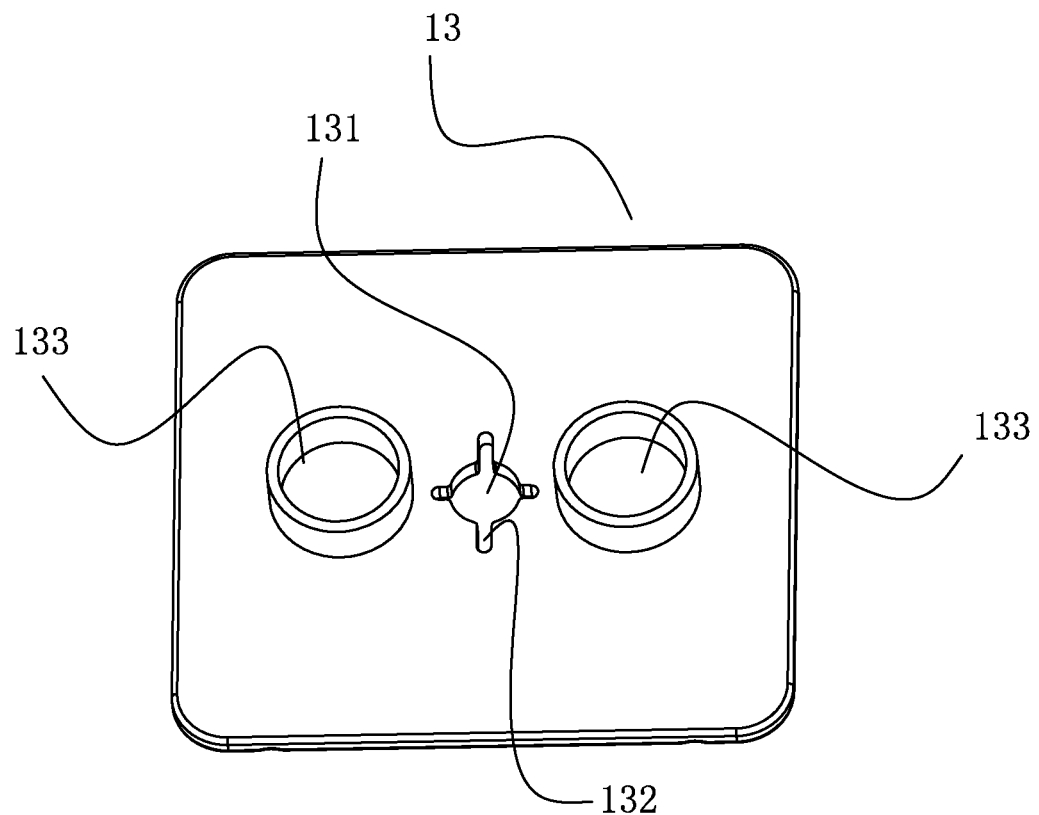
FIG. 6 is a three-dimensional structural diagram of a movable part of lamp installation component according to an embodiment of the present invention.

Referring to FIG. 3, FIG. 4 and FIG. 6, in the embodiment, the elastic part 14 is a spring. The movable part 13 has a first accommodating groove 133, and the abutting part 12 has a second accommodating groove 121. One end of the spring abuts in the first accommodating groove 133 and the other end of the spring abuts in the second accommodating groove 121. Such a structural arrangement can allow the two ends of the spring to be respectively accommodated in the two accommodating grooves to avoid falling off or offset. More specifically, in the present embodiment, the number of springs is two, and the two springs are symmetrically arranged on both sides of the fixing column 30. Of course, the elastic parts 14 may also be multiple, and are evenly symmetrically spaced around the periphery of the fixing column 30. Such a structural arrangement makes the force of the movable part 13 more balanced, and the sliding process is more stable and flexible.

In the embodiment, in order to facilitate processing and reduce production costs, the fixed part 11, the movable part 13 and the abutting part 12 are all plate-like structures. Positioning grooves 40 with inward concave is formed on the two opposite faces of the fixed part 11 and the movable part 13. The part to be clamped after clamping can be limited within the positioning groove 40. Specifically, the positioning groove 40 is designed to fit the shape of the part to be clamped at the mounting position, for example, the parts to be clamped to be used to fix the position of lamps in the exhibition cabinet are mostly long cylindrical shelves set at parallel intervals. The positioning groove 40 can be designed as a circular arc groove arranged in long strips shape. Such a structural setting can make the fixation between the clamping portion formed between the fixed part 11 and the movable part 13 and the part to be clamped is more secure, and it is not easy to slide or fall off. In addition, in order to facilitate the user to quickly separate the fixed part 11 from the movable part 13 and then clamp the part to be clamped at the position to be installed, the wall face of the fixed part 11 toward the movable part 13 is also provided with a partition block 41 for isolating the fixed part 11 from the movable part 13. Under the action of partition block 41, the fixed part 11 and the movable part 13 can form an isolation gap that is convenient for users to separate them.

Figure 5:
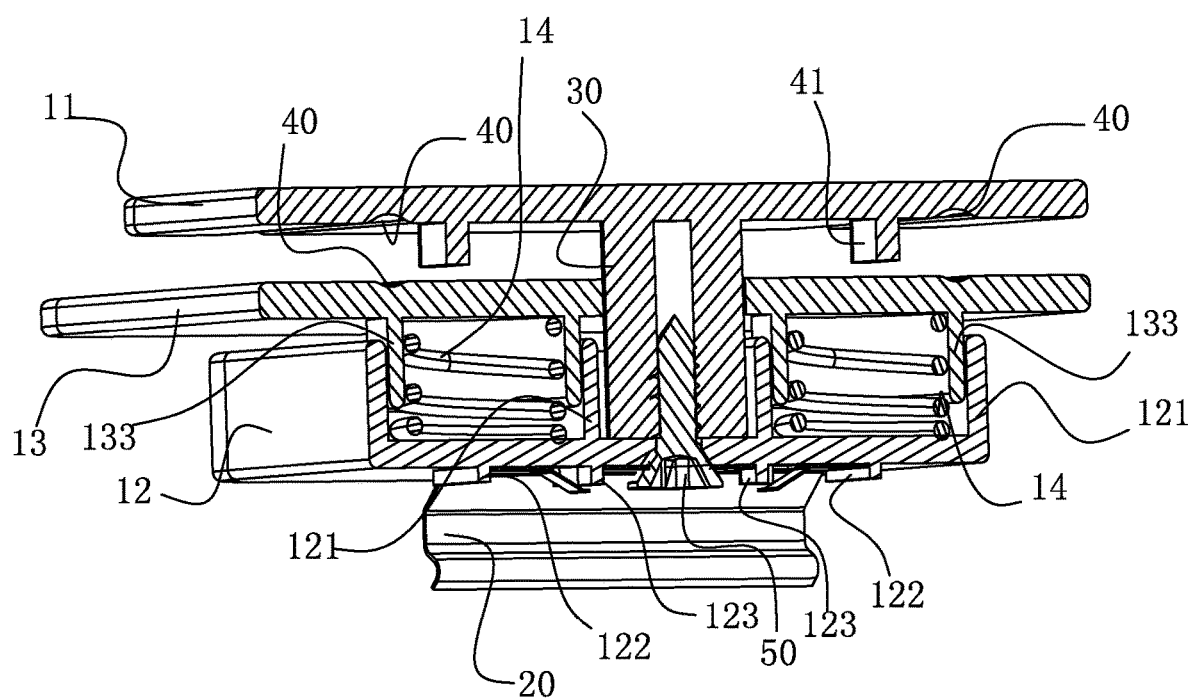
FIG. 5 is a cross-sectional view of lamp installation component in accordance with an embodiment of the present invention.

The housing of the existing lamp has a long strip shape. In the embodiment, the mounting frame 20 for mounting the lamp is a strip-shaped card slot. The card slot is fixedly connected to the abutting part 12 by screws 50. Specifically, the card slot has screw holes 202 through which the screw 50 passes. The card slot can be a flexible metal card slot, so that the lamp to be installed can be more conveniently and securely clamped in the strip card slot. Specifically, the fixing is performed only by the screw 50, and the card slot may rotate relative to the abutting part 12. Referring to FIG. 3 and FIG. 5, in the embodiment, a strip rib 122 for limiting the movement of the card slot along the length direction is arranged on the abutting part 12 corresponding to the corresponding position of the two ends of the card slot. Further, the card slot is also provided with a spacing hole 201 on the bottom wall fitting with the abutting part 12. Correspondingly, the abutting part 12 has a limiting protrusion 123 that is inserted into the spacing hole 201. The limiting protrusions 123 and the spacing holes 201 cooperate with each other to prevent the card slot from rotating or sliding relative to the abutting part 12, so that the fixing of the card slot is more secure.

The lamp installation component in this embodiment is used as follows: First, press the movable part 13 to make the movable part 13 slide away from the fixed part 11, that is, the clamping portion formed between the fixed part 11 and the movable part 13 is in an open state. Then, the lamp installation component is positioned close to the part to be clamped at the mounting position, so that the part to be clamped is positioned at the clamping portion, and then loosen the movable part 13, at which time the movable part 13 is reset under the action of elastic part 14 and in a clamping state, the lamp installation component is fixed at the position to be installed, and then the lamp is directly clamped on the mounting frame 20; When it is necessary to move the lamp installation component or disassemble it, just press the movable part 13 again and make the clamping portion open to move or remove it. The lamp installation component has a simple structure and can be installed or disassembled with one hand, and is more convenient for use in a showcase or other small installation space.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

What is claimed is:

1. A lamp installation component, comprising:
   a clamping assembly for damping on a mounting part, and a mounting frame for assembling a lamp, the mounting frame is a strip-shaped card slot having two ends;
   the clamping assembly includes fixed part, abutting part, movable part and elastic part, and the fixed part is relatively fixed with the abutting part, and the movable part is slidably disposed between the fixed part and the abutting part, and the elastic part is held between the movable part and the abutting part, so that the movable part has a tendency to form a clamped state dose to the fixed part; the mounting frame is fixedly connected to the abutting part by a screw;
   strip ribs for limiting movement of the card slot along a lengthwise direction are arranged on the abutting part corresponding to the two ends of the card slot;
   wherein the card slot further comprises a spacing hole which fits with the abutting part; and the abutting part has a limiting protrusion that is inserted into the spacing hole.

2. The lamp installation component as claimed in claim 1, wherein a fixing column having a first end and a second end is disposed between the fixed part and the abutting part, and the first end of the fixing column is fixedly connected to the fixed part, and the second end is fixedly connected to the abutting part;
   the movable part is provided with a slide hole, and the movable part is slidably sleeved on the fixing column through the slide hole.

3. The lamp installation component as claimed in claim 2, wherein a guide rib is further formed along an axial direction on a side wall of the fixing column, and a periphery of the slide hole on the movable part has guide rib slots adapted to the guide rib.

4. The lamp installation component as claimed in claim 3, wherein a number of elastic parts is two, and the two elastic parts are symmetrically arranged on both sides of the fixing column.

5. The lamp installation component as claimed in claim 4, wherein the elastic part is a spring, and the movable part has a first accommodating groove, and the abutting part has a second accommodating groove, and one end of the spring abuts in the first accommodating groove and an opposite end of the spring abuts in the second accommodating groove.

6. The lamp installation component as claimed in claim 5, wherein positioning grooves with inward concavity are formed on two opposite faces of the fixed part and the movable part, and the mounting part can be limited within the positioning grooves in the clamped state.

7. The lamp installation component as claimed in claim 1, wherein the fixed part, the movable part and the abutting part are all plate-like structures.

8. The lamp installation component as claimed in claim 1, wherein a wall face of the fixed part facing the movable part is also provided with a partition block for isolating the fixed part from the movable part.

* * * * *